(12) United States Patent
Chen et al.

(10) Patent No.: US 7,445,742 B2
(45) Date of Patent: Nov. 4, 2008

(54) IMPRINTING NANOSCALE PATTERNS FOR CATALYSIS AND FUEL CELLS

(75) Inventors: Yong Chen, Redwood City, CA (US); David Hacklernan, Monmouth, OR (US); Laurie S. Mittelstadt, Belmont, CA (US); Yoocham Jeon, Palo Alto, CA (US); Richard Stanley Williams, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 512 days.

(21) Appl. No.: 10/642,371

(22) Filed: Aug. 15, 2003

(65) Prior Publication Data

US 2005/0037916 A1    Feb. 17, 2005

(51) Int. Cl.
*B29C 59/00* (2006.01)
*B29C 43/04* (2006.01)
*B28B 3/00* (2006.01)
*B29C 33/42* (2006.01)

(52) U.S. Cl. .................... 264/293; 264/482; 977/887; 977/890; 502/101

(58) Field of Classification Search .................. 264/293, 264/482; 977/887; 502/101; 29/623.4
See application file for complete search history.

(56) References Cited

U.S. PATENT DOCUMENTS

| | | | |
|---|---|---|---|
| 4,936,956 A * | 6/1990 | Wrighton | 205/777.5 |
| 5,338,430 A | 8/1994 | Parsonage et al. | |
| 5,772,905 A | 6/1998 | Chou | |
| 6,136,412 A | 10/2000 | Spiewak et al. | |
| 6,190,929 B1 | 2/2001 | Wang et al. | |
| 6,294,450 B1 | 9/2001 | Chen et al. | |
| 6,309,580 B1 | 10/2001 | Chou | |
| 6,365,059 B1 | 4/2002 | Pechenik | |
| 6,407,443 B2 | 6/2002 | Chen et al. | |
| 6,432,740 B1 | 8/2002 | Chen | |
| 6,943,117 B2 * | 9/2005 | Jeong et al. | 438/694 |
| 2002/0012825 A1 * | 1/2002 | Sasahara et al. | 429/30 |

OTHER PUBLICATIONS

H. Schift, L.J. Heyderman, C. Padeste, J. Gobrecht, Chemical nanopatterning using hot embossing lithography, Microelectronic Engineering, vol. 61-62 (2002) 423-428.*
N. Roos, H. Schulz, L. Bendfeldt, M. Fink, K. Pfeiffer, H.-C. Scheer, First and secod generation purely thermoset stamps for hot embossing, Microelectronic Engineering, vol. 61-62 (2002) 399-405.*
Zhang, Wei, Development of Large-Area and Multilevel Nanoimprint Lithography and the Application in MOSFETs, Dissertation for the degree of Doctor of Philosophy, Princeton University, Nov. 2001, pp. 40-48.*
Hu, Wenchong et al., "Growth of well-aligned carbon nanotube arrays on silicon substrates using porous alumina film as a nanotemplate," Applied Physics Letters 79(19):3083-3085 (2001).

* cited by examiner

*Primary Examiner*—Matthew J. Daniels

(57) ABSTRACT

A method and mold for creating nanoscale patterns in an ion-selective polymer membrane is provided, in which a mold comprising a substrate and a molding layer having at least one protruding feature is imprinted on the ion-selective polymer membrane, thereby creating a recessed feature in the membrane. Protruding features having nanoscale dimensions can be created, e.g., by using self-assembled nanostructures as a shadow mask for etching a molding layer. In one embodiment, an imprinted ion selective polymer membrane, suitable for use as a solid electrolyte, is adapted for use in an electrochemical device or fuel cell by adding a metal catalyst to one portion of the membrane to serve as a catalytic electrode.

30 Claims, 4 Drawing Sheets

IMPRINTING NANOSCALE PATTERNS FOR CATALYSIS AND FUEL CELLS

BACKGROUND

In catalytic processes, it is important to control the size and spacing of catalysts to enhance their efficiency. For the catalytic processes of fuel cells, it is even more crucial since the spacing between the catalysts will provide a channel for ions to diffuse from one electrode to another. Conventional methods, such as optical and e-beam lithography methods, have been used to make patterned catalysts to enhance catalysis efficiency. However, nanoscale patterns would exceed the lower limits of optical lithography. Similarly, e-beam lithography is too expensive and slow, and in many cases, can not provide the required nanoscale resolution. A third solution is the application of catalytic materials to a particle, often of spherical or semi-spherical shape and subsequently taking these particles and placing them in a supporting binder. An example of such a system is the catalytic "converter" used in automobile exhaust systems. However, this technique does not enable the separation of oxidation and reduction reaction processes in a method permitting easy redirection of electron transfer toward their utilization as an electric power source.

SUMMARY OF THE INVENTION

This invention provides a means for making designed nanoscale catalyst patterns using a nanoimprinting process to improve catalysis and fuel cell efficiency. In addition, the invention includes an embodiment which enables the fuel molecule, appropriate catalytic surface, conductor, and ionic transport layer of a fuel cell to all meet in a more efficient and structured manner for better energy conversion than existing systems.

One embodiment of the present invention provides a mold for the nanoimprinting process. The mold contains one or more protruding features having nanoscale dimensions, i.e., a lateral dimension of about 1 nm to 100 μm. In a preferred version, a plurality of protruding features form a regular pattern. In another version, the protruding feature has the shape of pillar. In yet another version, the mold is comprised of a substrate and a molding layer, for example, a silicon substrate and a silicon dioxide molding layer.

Another embodiment of the present invention provides a method for preparing such a mold for use in nanoimprinting. This method includes the steps of overlaying one or more nanoscale masking elements on top of the mold, etching portions of the mold not covered by the masking elements to form protruding features in the mold; and removing the masking elements on top of the protruding features. In a preferred version, the nanoscale masking elements are self-assembled dots, islands or nanoparticles having a diameter of about 1 nm to 1 μm, although other geometric shapes, such as a porous membrane, are possible. In a preferred version, nanoparticles are formed by evaporation of metal on the surface of the mold. Alternatively, a film comprising a self-assembled particle array is prepared at the surface of a Langmuir-Blodgett trough and transferred to the molding layer. The protruding features formed by the method will typically have a lateral dimension of about 1 nm to 100 μm. When nanoparticles are used as a masking elements the protruding features will have the shape of a pillar.

Yet another embodiment provides a method of making nanoscale catalyst patterns, which involves a malleable membrane and a mold having one or more nanoscale protrusions. The protrusions are pressed into the membrane to form one or more nanoscale recesses in the membrane. These nanoscale recesses will generally form the obverse shape of the protrusions, each recess having a bottom and side walls between the top surface of the membrane and the bottom of the recess. A layer of catalytic material is then deposited on the top surface of the membrane and the bottom of the recesses. In preferred versions, the side walls remain substantially free of catalytic material. The membrane is preferably a polymeric material, most preferably an ion conductive membrane, such as a perfluorosulfonic acid polymer electrolyte, which is capable of serving as a solid electrolyte in electrochemical applications. Moreover, the catalytic material is preferably a material which can also serve as an electrode, i.e., a metal such as platinum.

A preferred embodiment is a membrane electrode assembly, which includes an ion conductive membrane having a top surface and one or more nanoscale recesses. Each recess will have a bottom, and side walls between the top surface of the membrane and the bottom of the recess. The membrane electrode assembly also includes a catalytic electrode layer coating the top surface of the membrane and the bottom the recess(es). The ion conductive membrane can be a cation- or proton-transporting polymeric electrolyte material, but preferably includes salts of polymers containing anionic groups. A preferred shape for the recess is that of a nanohole. More preferably, a plurality of recesses form a regular pattern, wherein the recesses are separated by spaces of about 1 nm to 100 μm. In another preferred version, the bottom of the recess is parallel to the top surface of the membrane and the side walls are perpendicular to the top surface of the membrane and the bottom of the recess.

Another preferred embodiment is an electrochemical device. The device includes a solid electrolyte, which is an ion conductive membrane imprinted with a plurality of nanoscale features. The device also includes a first catalytic electrode surface adjoining one portion of the membrane and a second catalytic electrode surface adjoining another portion of the membrane. This structure is sandwiched between two porous, electrically conducting current-collectors which allow electron conduction as well as fuel delivery to the catalyst and electrolyte. A circuit connects the first and second current collectors.

Yet another preferred embodiment is a fuel cell, including the aforementioned electrochemical device and reactants capable of undergoing an oxidation reduction at the catalytic electrodes. The reactants generally include a fuel, such as hydrogen, and an oxidant, such as oxygen.

BRIEF DESCRIPTION OF THE DRAWINGS

These and other features, aspects, and advantages of the present invention will become better understood with respect to the following description, appended claims, and accompanying drawings where:

DETAILED DESCRIPTION

I. Preparing the Mold

The present invention includes methods for making a mold, which has at least one protruding feature having nanoscale dimensions, and using the mold to imprint a membrane, thereby creating a recessed feature, which is a reverse copy of the protruding feature, in the membrane.

In general, the body of the mold should be constructed of materials that are hard relative to the membrane used during the imprinting process. For example, the mold can be made of metals, dielectrics, semiconductors, ceramics, polymers or combinations thereof. Typically, the mold will include a plurality of features having a desired shape. In a preferred embodiment, the mold is silicon or silicon dioxide.

The mold is patterned with protruding and/or recessed features, such as pillars, holes, dams, and trenches, with a minimum lateral feature size of about 1 nm. The typical depth (or height) of a feature is from 1 nm to 100 μm, depending on the desired lateral dimension. In certain embodiments, the desired lateral dimension of the protruding and/or recessed feature may be less than or equal to about 10 μm, about 1000 nanometers, about 500 nanometers, about 100 nanometers, about 90 nanometers, about 80 nanometers, about 70 nanometers, about 60 nanometers, about 50 nanometers, about 40 nanometers, about 30 nanometers, about 25 nanometers, about 20 nanometers, about 15 nanometers, about 10 nanometers, about 5 nanometers, about 3 nanometers, about 2 nanometers, about 1 nanometer and any range derivable therein. Similarly, the spacings between features are generally about 1 nm to 100 μm.

Figure 1A:
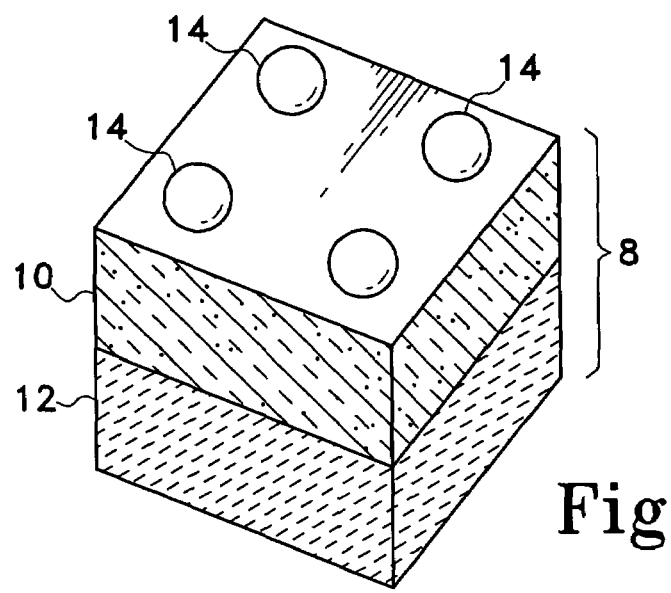
FIGS. 1A-1C show steps for making a mold for nanoimprinting in accordance with one version of the present invention.
Figure 1B:
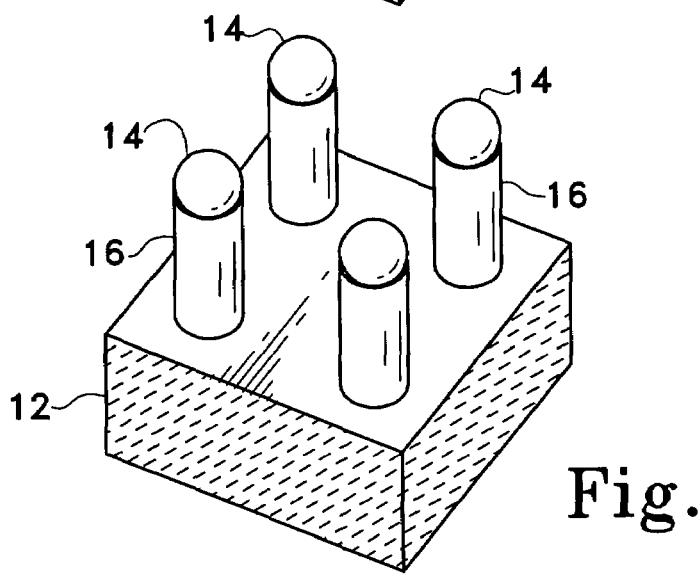
Figure 1C:
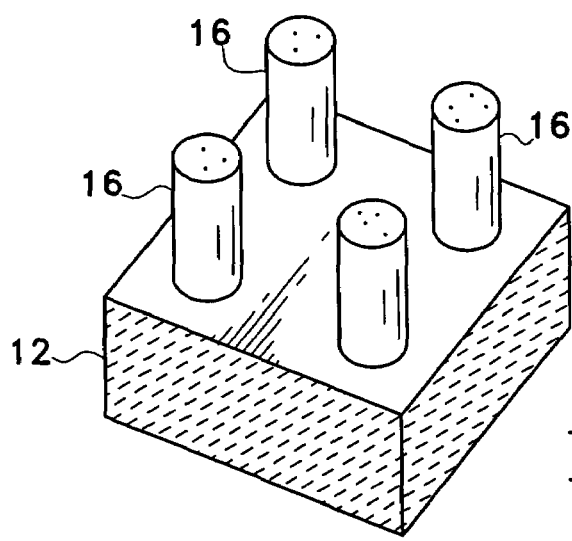

FIGS. 1A-1C shows steps for preparing an imprinting mold in accordance with one embodiment. As shown in FIG. 1A, the mold 8 can be comprised of a molding layer 10 grown or deposited as a thin film over the substrate 12.

One or more nanoscale masking elements 14 are then placed on top of the mold 8 for use as a shadow mask for etching the mold. For the embodiment show in FIG. 1A, nanoparticles are the masking elements deposited on the top of the molding layer 10.

The nanoparticles have sizes ranging from about 1 nm to 1 μm. In certain embodiments, the diameter of the nanoparticles may be less than or equal to about 1000 nanometers, about 500 nanometers, about 100 nanometers, about 90 nanometers, about 80 nanometers, about 70 nanometers, about 60 nanometers, about 50 nanometers, about 40 nanometers, about 30 nanometers, about 25 nanometers, about 20 nanometers, about 15 nanometers, about 10 nanometers, about 5 nanometers, about 3 nanometers, about 2 nanometers, about 1 nanometer and any range derivable therein. The nanoparticles can be made of metals, dielectrics, semiconductors, ceramics, polymers or combinations thereof. The nanoparticles can be prepared by direct evaporation of thin metals, such as Pt or Cr, on the surface to form self-assembled nanoparticles. The size and spacing of the particles can be controlled by the selected metals and deposition conditions in direct metal deposition. Alternatively, deposition of self-assembled nanoparticles, made of metals, dielectrics, semiconductors, ceramics, polymers or combinations thereof, from e.g., a Langmuir trough, or other physical or chemical methods may be utilized to prepare the nanoparticles used in certain embodiments of the present invention. In one embodiment, the spacing can be controlled more accurately by attaching molecules to the particles and preparing a regular particle array by a Langmuir trough.

Nanoparticles that are homogenous in size can be made, with controllable sizes ranging from about 1 nm to 1 μm. Accordingly, nanoscale features at resolution levels much less than that of the state-of-the-art e-beam lithography can be attained using preferred versions of the present method. Compared with e-beam lithography, this method is also cheap and quick. Moreover, by making one mold, one can use it to generate many copies.

As shown in FIG. 1B, the nanoscale masking elements 14, e.g., nanoparticles, are then used as a shadow mask during the vertical etching of the mold 8 (usually by reactive ion etching method, which etches the mold anisotropically so that the areas not covered by the nanoparticles will remain intact). Accordingly, the portion of the molding layer protected by the nanoscale masking elements forms protruding features 16 having nanoscale dimensions. For example, when nanoparticles are used as the masking elements, the etching process generates vertical pillars under the areas covered by particles (FIG. 1B). The height of the pillars will be determined by the etching conditions, especially the etching time As shown in FIG. 1C, the masking elements 14 may be removed before the mold is used for imprinting.

Figure 2A:
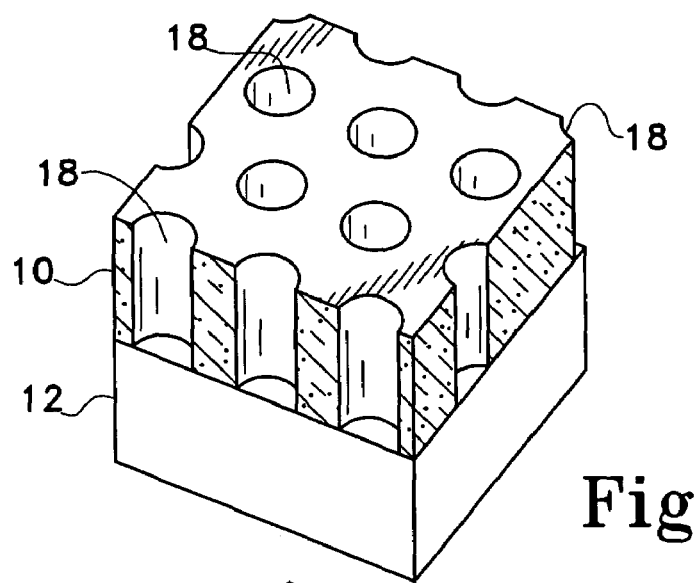
FIGS. 2A-2C show alternative embodiments for preparing a mold for nanoimprinting.

In additional embodiments, the imprinting mold can be prepared by other self-assembled methods. For an example, a porous mold 18 can be formed by anodizing materials under certain conditions, as shown in FIG. 2A (e.g. anodized alumina can form vertical poles with regular diameters and spacings at nanometer scale. See, e.g., D., Yu-Hwa Lo, Miller, A. E., Crouse, M., "Self-assembled nanostructures using anodized alumina thin films for optoelectronic applications," IEEE LEOS12$^{th}$ Annual Meeting, Conference Proceedings, Vol. 1, Pg. 234, 1999, incorporated herein by reference).

Figure 2B:
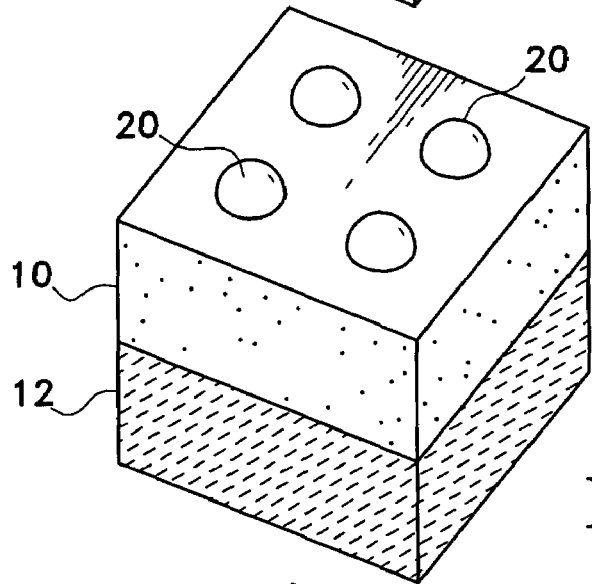

The growth of metal or semiconductors on a substrate may also induce the formation of nanoscale self-assembled islands 20 or similar structures (FIG. 2B), which might also be used to generate a pillar-like mold like that shown in FIG. 1B.

Figure 2C:
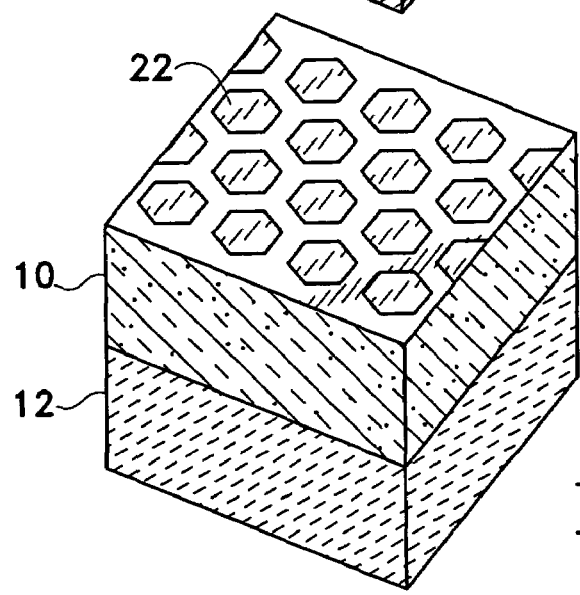

Other self-assembly methods, such as self-assembled biological membranes 22 with regular nanoscale patterns (FIG. 2C) may also be used as etching mask to generate molds for this application.

II. Imprinting the Membrane

Figure 3A:
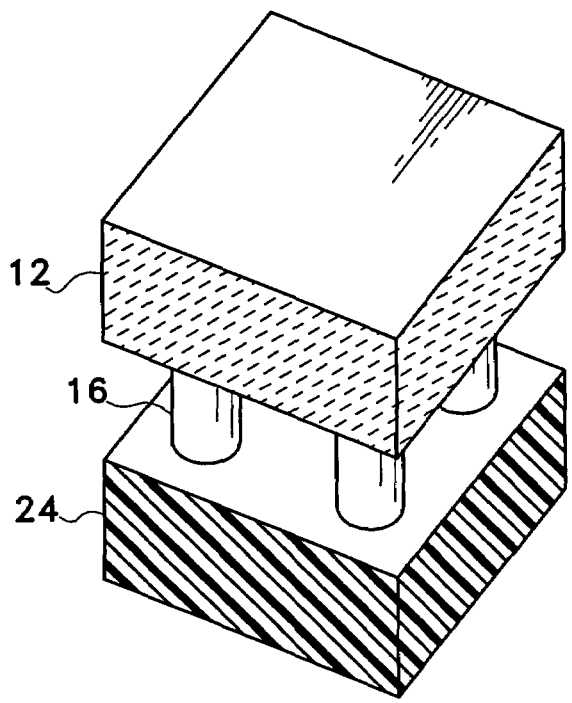
FIGS. 3A-3C show steps for imprinting a membrane in accordance with one version of the present invention.
Figure 3B:
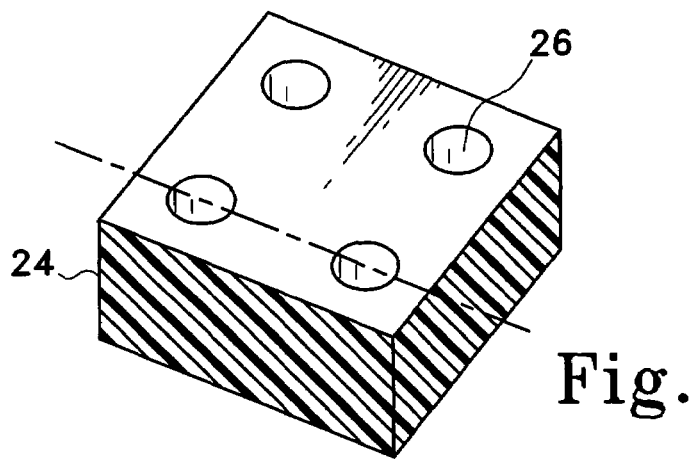
Figure 3C:
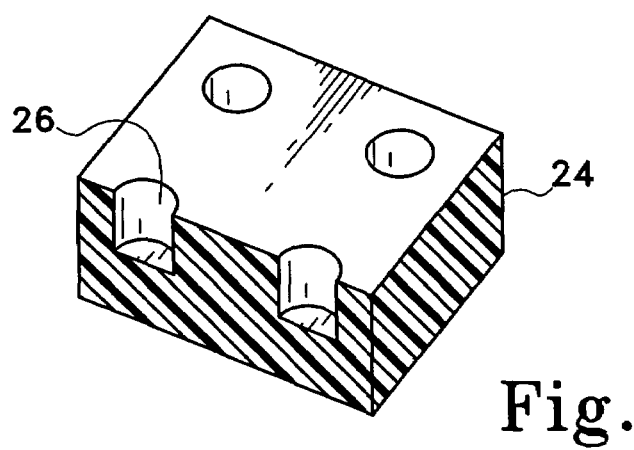

FIGS. 3A-3C show steps for the imprinting process in accordance with one embodiment. As shown in FIG. 3A, the protruding features 16 of the mold can be pressed directly into a membrane 24 and then separated from the membrane (for details of the imprinting process, see also U.S. Pat. No. 5,772,905, incorporated herein by reference).

The membrane should be a malleable material capable of retaining the impression from the mold. For electrochemical applications, the membrane may be composed of any suitable ion exchange electrolyte capable of being used as a solid electrolyte for transporting ions. Membranes useful in the present invention can include ion conductive materials, such as polymer electrolytes, and ion-exchange resins. The ion conductive membrane can be a cation- or proton-transporting material, but is most preferably a proton conducting polymeric material suitable for use in proton exchange membrane fuel cells.

Preferred ion conductive polymer membranes include fluorocarbon-type ion-exchange resins having sulfonic acid group functionality, including Nafion 117, 115, and 112 membranes. Additional materials suitable for use in an ion conductive membrane are described in U.S. Pat. No. 6,136,412 (incorporated herein by reference).

Any suitable source of pressure, such as a hydraulic press, may be employed. In addition, the process is adaptable to a continuous process, using either a flat bed press in a repeating operation or rollers in a continuing operation. The pressure, temperature and duration of pressing may be any combination sufficient to form an impression in the membrane. The precise conditions used will depend in part in the nature of the nanoscale features and membrane used.

As shown in FIGS. 3B and 3C, the imprinting process will generate a plurality of recessed features 26 in the membrane 24, which generally conform to the shape of the protruding features in the mold. For the embodiment shown in FIGS. 3A-3C, the imprinting process generates a plurality of nanoholes, which are reversed copies of the pillars in the mold.

Generation of patterns of protruding or recessed shapes in the membrane, such as holes, pores, bumps, pillars, walls or trenches, that have a lateral dimension of diameter of about 1 nm to 100 µm and side walls having a depth (or height) of about 1 nm to 100 µm, are also contemplated as alternative versions of the present invention.

III. Catalytic Material Deposition

Figure 4A:
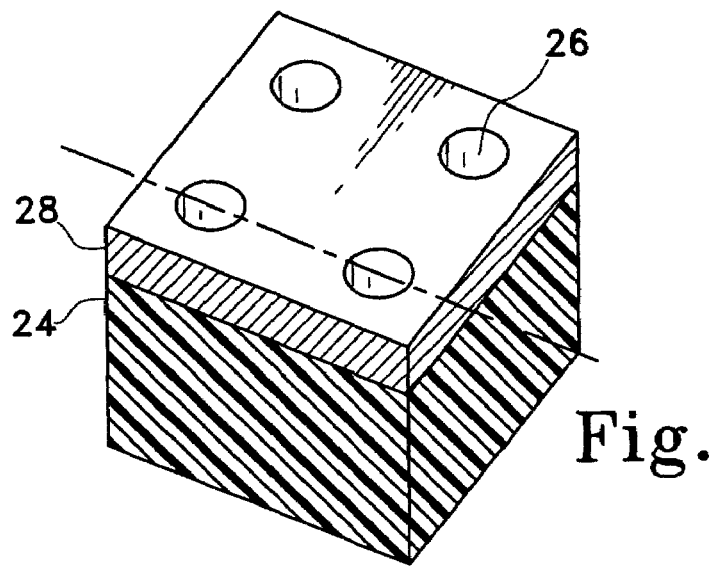
FIGS. 4A and 4B show the step of depositing a catalytic layer on an imprinted membrane in accordance with one version of the present invention.
Figure 4B:
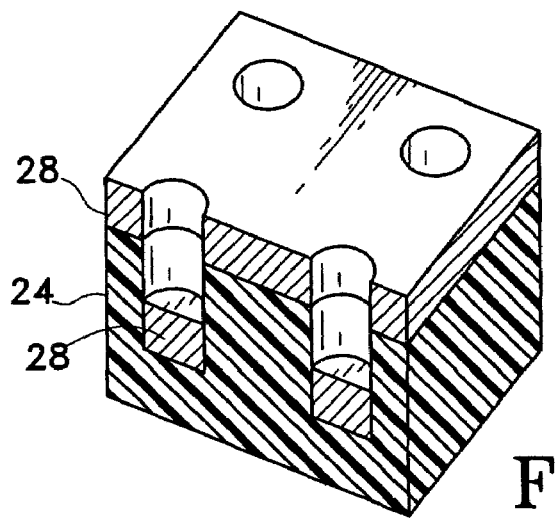

FIGS. 4A and 4B show the step of depositing a layer of catalytic material 28 on the imprinted membrane 24 in accordance with one embodiment.

Generally the catalytic material is selected to optimize an electrochemical reaction. Preferably, the catalytic material is selected from the group consisting of conducting metals, semi-metals and semiconductors. Such materials include Cr, Co, Ir, Ni, Pd, Pt, Au, Ag, Cu, Be, Mg, Sc, Y, La, Ti, Zr, Hf, V, Nb, Ta, Mo, W, Mn, Tc, Re, Fe, Ru, Os, Rh, Zn, Cd, Hg, B, Al, Ga, In, Tl, C, Si, Ge, Sn, Pb, As, Sb, Bi, Se, Te and alloys thereof, such as CrCo, NiCr, PtRu and PtIr.

The catalytic material may be deposited by chemical means including vacuum deposition methods, such as vacuum sublimation, sputtering, vapor transport, and chemical vapor deposition. The thickness of the catalytic layer is preferably in the range from about 1 nm to 1 µm. The thickness of the catalytic layer may be such that the coating of the recessed features and the surface of the membrane remain substantially disconnected. Certain embodiments of the present invention can include an appropriate chemical bonding process as an additional step after deposition to ensure that there is a chemical bond between the catalytic material deposited and the membrane surface. Examples of an appropriate chemical bonding process includes laser heat application, oxidation, reduction as well as other thermal means and other chemical applications that promote reactions.

In a preferred embodiment, shown in FIG. 4A, a layer of metal (e.g., platinum) is deposited vertically by e-beam evaporation on the polymer surface. As shown in the cross-section of FIG. 4B, the metal will be in fact deposited on the bottom of the nanoholes and top surface of the polymer, leaving the vertical side walls at least partially uncoated. The metal layer deposited on the top surface (beyond the hole areas) is continuous and can be in contact with a porous current collector that allows efficient electron conduction and fuel delivery.

IV. Fuel Cells

Electrochemical devices, such as fuel cells, sensors, electrolyzers, chlor-alkali separation membranes and the like, have been constructed from membrane electrode assemblies. Such membrane electrode assemblies comprise at least one electrode portion, which includes a catalytic electrode material, e.g., Pt, in contact with an ion conductive material. The ion conductive material serves as a solid electrolyte, which transports ions formed at the anode to the cathode, allowing current to flow in an external circuit connecting the electrodes.

Fuel cells operate by enabling the release of free energy from reactants in oxidation reduction reactions in a manner which allows the associated electron transfers to be restricted to the reactants through the utilization of an external electrical conduction circuit. The surface including the catalyst may be used as a very effective electrode for an electrochemical device such as a fuel cell or sensor. The process may be repeated on the other side of the membrane so that one side is the cathode and the other the anode.

For example, in a hydrogen/oxygen fuel cell, hydrogen ions are formed at the anode, travel across the solid electrolyte, and combine with oxygen at the cathode to form water. Since the solid electrolyte is generally a proton conducting polymeric material that does not conduct electrons, electrical current flows through an external circuit, generating electricity. This structure is sandwiched between two porous, electrically conducting current-collectors which allow efficient electron transfer as well as delivery of fuel to the catalyst and electrolyte.

An embodiment of the present invention can be used as a fuel cell wherein the metal layer deposited on the top surface of a imprinted membrane (apart from the recesses) is in contact with a porous current collector that allows efficient electron conduction and fuel delivery. Also, because of the geometry of the metal deposition, a nanostructure is formed in which the edges of the catalyst are in contact with the electrolyte surface. This allows for the efficient delivery of protons formed at the catalyst edge to the electrolyte. The fuel is separated from the oxidant by the solid electrolyte, which allows ion conduction but not electron conduction.

Accordingly, a membrane electrode assembly can be made in accordance with the present invention, which is suitable for use in electrochemical devices, including proton exchange membrane fuel cells, sensors, electrolyzers, chlor-alkali separation membranes and the like.

V. Alternative Embodiments

Figure 5:
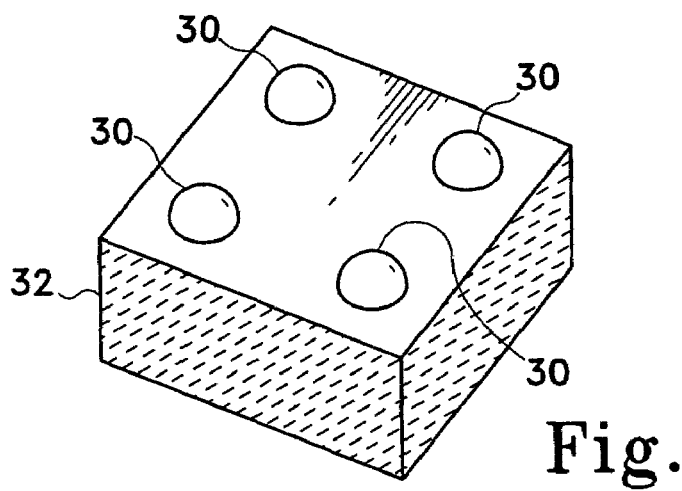
FIG. 5 shows another embodiment where nanoscale catalyst dots are deposited on the surface of a substrate.

FIG. 5 illustrates another embodiment, where the same mold and imprinting process can be used to form nanoscale catalyst dots 30 on an arbitrary substrate 32, such as $SiO_2$ and $Al_2O_3$, using a lift-off process to remove a molded layer on top of a substrate 32. The sizes and spacings of the catalyst dots 30 are the same as the nanoparticles 14 deposited on the surface in FIG. 1A. By using the methods described above to control the sizes and spacings, one can design special catalyst arrays to improve catalysis efficiency for special processes. For example, an array of Pt nanoscale dots may be employed when compounds containing Si—H are used to synthesize polymeric materials. Similarly, catalyst dots could be made on a solid electrolyte material rather than deposited over holes as described above.

VI. Advantages of the Invention

The previously described versions of the present invention have many advantages, including the following;

1) high resolution patterns can be made that can not be reached by previous methods;
2) they are less expensive;
3) they are simpler and quicker;
4) controllable catalyst sizes and spacings are provided to optimize catalysis and fuel cell efficiency; and
5) locations are designed for the initiation of electron transfer and ion migration processes in fuel cells;

Although the present invention has been described in considerable detail with reference to certain preferred versions thereof, other versions are possible. Therefore, the sprit and scope of the appended claims should not be limited to the description of the preferred versions contained herein.

What is claimed is:

1. A method of making nanoscale catalyst patterns for an ion exchange membrane, comprising:
   providing a mold having a top surface;
   establishing at least one nanoscale masking element on at least a portion of the top surface;
   etching exposed portions of the mold to form at least one nanoscale protrusion therein;
   pressing the at least one nanoscale protrusion into a top surface of the membrane to form at least one nanoscale recess therein the at least one recess having a bottom and side walls, wherein the side walls extend from the top surface of the membrane to the bottom of the at least one recess;
   depositing a layer of catalytic material on the top surface of the membrane and the bottom of the at least one recess such that the side walls remain substantially free of catalytic material; and
   chemically bonding, via laser heat application, oxidation or reduction, the layer of catalytic material to the top surface of the membrane and the bottom of the at least one recess.

2. The method of claim 1 wherein the membrane comprises a polymer.

3. The method of claim 1 wherein the membrane is an ion conductive membrane.

4. The method of claim 1 wherein the membrane is a polymer electrolyte membrane.

5. The method of claim 1 wherein the membrane comprises a perfluorosulfonic acid polymer electrolyte.

6. The method of claim 1 wherein the mold comprises a substrate and a molding layer including an array of nanoscale protrusions formed therein, each of the nanoscale protrusions having nanoscale dimensions.

7. The method of claim 1 wherein the at least one nanoscale protrusion has a lateral dimension ranging from about 1 nm to about 100 nm.

8. The method of claim 1 wherein the at least one nanoscale protrusion has a height ranging from 1 nm to about 100 μm.

9. The method of claim 1 wherein the at least one nanoscale protrusion has the shape of a pillar.

10. The method of claim 1 wherein the mold includes an array of nanoscale protrusions, and wherein the nanoscale protrusions form a regular pattern.

11. The method of claim 1 wherein the at least one nanoscale recess has the obverse shape of the at least one nanoscale protrusion.

12. The method of claim 1 wherein the bottom of the at least one nanoscale recess is parallel to the top surface of the membrane.

13. The method of claim 1 wherein the side walls of the at least one recess are perpendicular to the bottom of the at least one recess and the top surface of the membrane.

14. The method of claim 1 wherein the catalytic material is also an electrode.

15. The method of claim 1 wherein the catalytic material comprises a metal.

16. The method of claim 15 wherein the metal is platinum.

17. A method of making nanoscale catalyst patterns for an ion exchange membrane, comprising:
   providing a malleable ion exchange membrane having a top surface;
   providing a mold having at least one nanoscale protrusion;
   imprinting the at least one nanoscale protrusion into the membrane to form at least one nanoscale recess in the membrane, the at least one recess having a bottom and side walls, wherein the side walls extend from the top surface of the membrane to the bottom of the at least one recess;
   depositing a layer of catalytic material on the top surface of the membrane and the bottom of the at least one recess such that the side walls remain substantially free of catalytic material; and
   chemically bonding, via laser heat application, oxidation or reduction, the layer of catalytic material to the top surface of the membrane and the bottom of the at least one recess.

18. The method of claim 17 wherein the membrane comprises a polymer.

19. The method of claim 17 wherein the membrane is an ion conductive membrane or a polymer electrolyte membrane.

20. The method of claim 17 wherein the membrane comprises a perfluorosulfonic acid polymer electrolyte.

21. The method of claim 17 wherein the mold comprises a substrate and a molding layer including an array of protruding features having nanoscale dimensions.

22. The method of claim 17 wherein the at least one nanoscale protrusion includes a lateral dimension ranging from about 1 nm to about 100 μm, and a height ranging from about 1 nm to about 100 μm.

23. The method of claim 17 wherein the at least one nanoscale protrusion has the shape of a pillar.

24. The method of claim 17 wherein the mold includes an array of nanoscale protrusions that form a regular pattern.

25. The method of claim 17 wherein the at least one nanoscale recess has the obverse shape of the at least one nanoscale protrusion.

26. The method of claim 17 wherein the bottom of the at least one recess is parallel to the top surface of the membrane, and the side walls of the at least one recess are perpendicular to the bottom of the at least one recess and the top surface of the membrane.

27. The method of claim 17 wherein the side walls of the at least one recess have a depth ranging from about 1 nm to about 100 μm.

28. The method of claim 17 wherein the catalytic material is also an electrode.

29. The method of claim 17 wherein the catalytic material comprises a metal including platinum.

30. The method of claim 17 wherein the at least one recess has a lateral dimension ranging from about 1 nm to about 100 μm.

* * * * *

UNITED STATES PATENT AND TRADEMARK OFFICE
CERTIFICATE OF CORRECTION

PATENT NO. : 7,445,742 B2  Page 1 of 1
APPLICATION NO. : 10/642371
DATED : November 4, 2008
INVENTOR(S) : Yong Chen et al.

It is certified that error appears in the above-identified patent and that said Letters Patent is hereby corrected as shown below:

In column 1, line 42, insert -- a -- before "pillar".

In column 1, line 61, after "100 μm" insert -- and a height of about 1 nm to 100 μm --.

In column 1, line 62, delete "elements" and insert -- element, --, therefor.

In column 2, line 21, after "bottom" insert -- of --.

In column 7, line 37, in Claim 7, delete "100 nm" and insert -- 100 μm --, therefor.

In column 7, line 39, in Claim 8, after "from" insert -- about --.

Signed and Sealed this

Thirtieth Day of June, 2009

JOHN DOLL
*Acting Director of the United States Patent and Trademark Office*